(12) United States Patent
Phillips

(10) Patent No.: US 8,493,378 B2
(45) Date of Patent: Jul. 23, 2013

(54) POLYGON DISSECTION IN A GEOGRAPHIC INFORMATION SYSTEM

(75) Inventor: Miles Henry Phillips, Aledo, TX (US)

(73) Assignee: LandWorks, Inc., Houston, TX (US)

( * ) Notice: Subject to any disclaimer, the term of this patent is extended or adjusted under 35 U.S.C. 154(b) by 0 days.

(21) Appl. No.: 13/598,207

(22) Filed: Aug. 29, 2012

(65) Prior Publication Data

US 2012/0320090 A1    Dec. 20, 2012

Related U.S. Application Data

(63) Continuation of application No. 12/615,063, filed on Nov. 9, 2009, now Pat. No. 8,284,192.

(60) Provisional application No. 61/112,664, filed on Nov. 7, 2008.

(51) Int. Cl.
| | | |
|---|---|---|
| *G06T 15/00* | (2011.01) | |
| *G06T 19/00* | (2011.01) | |
| *G06T 17/20* | (2006.01) | |
| *G06T 15/40* | (2011.01) | |
| *G06T 15/20* | (2011.01) | |

(52) U.S. Cl.
CPC .............. *G06T 19/00* (2013.01); *G06T 17/20* (2013.01); *G06T 15/40* (2013.01); *G06T 15/20* (2013.01)
USPC ........... 345/418; 345/419; 345/420; 345/421; 345/422; 345/423; 345/424; 345/426; 345/427; 345/467; 345/620; 709/217; 709/228; 701/117

(58) Field of Classification Search
CPC  G06T 19/00; G06T 17/20; G06T 15/40; G06T 15/20
USPC ......... 345/419–427, 467, 620; 709/217–228; 701/117, 202
See application file for complete search history.

(56) References Cited

U.S. PATENT DOCUMENTS

| | | | | |
|---|---|---|---|---|
| 6,975,334 | B1 * | 12/2005 | Barrus ........................ | 345/632 |
| 7,107,285 | B2 * | 9/2006 | von Kaenel et al. ................. | 1/1 |
| 7,197,500 | B1 * | 3/2007 | Israni et al. ................... | 707/809 |
| 7,644,131 | B2 * | 1/2010 | Levanon et al. .............. | 709/217 |
| 7,711,699 | B2 * | 5/2010 | Koromyslov et al. ........ | 701/117 |
| 2002/0120753 | A1 * | 8/2002 | Levanon et al. .............. | 709/228 |
| 2002/0145606 | A1 * | 10/2002 | Levanon et al. .............. | 345/423 |
| 2006/0164416 | A1 * | 7/2006 | Lee et al. ...................... | 345/427 |
| 2007/0061072 | A1 * | 3/2007 | Wuersch et al. .............. | 701/210 |
| 2007/0195094 | A1 * | 8/2007 | Adachi ........................ | 345/467 |
| 2008/0262723 | A1 * | 10/2008 | Wuersch et al. .............. | 701/210 |
| 2009/0005968 | A1 * | 1/2009 | Vengroff et al. .............. | 701/202 |
| 2009/0005987 | A1 * | 1/2009 | Vengroff et al. .............. | 701/300 |

* cited by examiner

*Primary Examiner* — Jin-Cheng Wang
(74) *Attorney, Agent, or Firm* — Osha • Liang LLP

(57) ABSTRACT

In general, the invention relates to a method for performing polygon dissections in a geographic information system. The method includes receiving a notification of a spatial update for a number of polygons, where each of the number of polygons overlaps at least one of a number of previously dissected polygons, determining that a dissection is required based on the spatial update, and obtaining an updated polygon, associated with the spatial update, and related polygons of the number of polygons, where each of the related polygons overlaps the updated polygon. The method further includes dissecting the updated polygon and the related polygons to obtain a number of dissected polygons and replacing at least one of the number of previously dissected polygons with the number of dissected polygons, where the at least one of the number of previously dissected polygons is invalid based on the spatial update.

22 Claims, 5 Drawing Sheets

POLYGON DISSECTION IN A GEOGRAPHIC INFORMATION SYSTEM

CROSS-REFERENCE TO RELATED APPLICATION

This application claims priority, pursuant to 35 U.S.C. §119(e), to the filing date of U.S. Patent Application Ser. No. 61/112,664, entitled "DISSECTION IN A GEOGRAPHIC INFORMATION SYSTEM," filed on Nov. 7, 2008, which is hereby incorporated by reference in its entirety. This application claims benefit under 35 U.S.C. §120 to and is a continuation of U.S. patent application Ser. No. 12/615,063 filed on Nov. 9, 2009, entitled "POLYGON DISSECTION IN A GEOGRAPHIC INFORMATION SYSTEM." U.S. patent application Ser. No. 12/615,063 is hereby incorporated by reference in its entirety.

BACKGROUND

A Geographic Information System (GIS) manages data related to geographic locations and/or areas. Typically, a GIS is used to provide a spatial context for analyzing attribute data and to generate maps based on the analysis. When displaying and analyzing polygons in the GIS, overlaps between the geographic region represented by each polygon should be considered to fully analyze attribute data associated with the overlapping geographic regions.

An analysis of the attribute data in view of the overlapping polygons may be performed manually by a GIS specialist or by running a script to process each of the overlapping polygons. Specifically, the analysis results in a snapshot in time of the attribute data in view of the overlap between the polygons. In this example, the snapshot in time may become outdated when the attribute data and/or the polygons are modified.

SUMMARY

In general, in one aspect, the invention relates to a method for performing polygon dissections in a geographic information system. The method includes receiving a notification of a spatial update for a number of polygons, where each of the number of polygons overlaps at least one of a number of previously dissected polygons, determining that a dissection is required based on the spatial update, and obtaining an updated polygon, associated with the spatial update, and related polygons of the number of polygons, where each of the related polygons overlaps the updated polygon. The method further includes dissecting the updated polygon and the related polygons to obtain a number of dissected polygons and replacing at least one of the number of previously dissected polygons with the number of dissected polygons, where the at least one of the number of previously dissected polygons is invalid based on the spatial update.

In general, in one aspect, the invention relates to a system for performing polygon dissections. The system includes an application for execution on a processor and configured to perform a spatial update for a number of polygons, where each of the number of polygons overlaps at least one of a number of previously dissected polygons. The system further includes a dissection module for execution on the processor and configured to, in response to receiving a notification of the spatial update, determine that a dissection is required and obtain an updated polygon, associated with the spatial update, and related polygons of the number of polygons, where each of the related polygons overlaps the updated polygon. The dissection module is further configured to dissect the updated polygon and the number of related polygons to obtain a number of dissected polygons and replace at least one of the number of previously dissected polygons with the number of dissected polygons, where the at least one of the number of previously dissected polygons is invalid based on the spatial update. The system further includes a data repository coupled to the dissection module and configured to store the number of dissected polygons.

In general, in one aspect, the invention relates to computer readable medium, embodying instructions executable by a computer to perform method steps for performing polygon dissections in a geographic information system, the instructions including functionality to receive a notification of a spatial update for a number of polygons, where each of the number of polygons overlaps at least one of a number of previously dissected polygons, determine that a dissection is required based on the spatial update, and obtain an updated polygon, associated with the spatial update, and related polygons of the number of polygons, where each of the related polygons overlaps the updated polygon. The instructions further including functionality to dissect the updated polygon and the related polygons to obtain a number of dissected polygons and replace at least one of the number of previously dissected polygons with the number of dissected polygons, where the at least one of the number of previously dissected polygons is invalid based on the spatial update.

Other aspects and advantages of the invention will be apparent from the following description and the appended claims.

BRIEF DESCRIPTION OF THE DRAWINGS

The appended drawings illustrate only typical embodiments of this invention and are therefore not to be considered limiting of its scope, for the invention may admit to other equally effective embodiments.

DETAILED DESCRIPTION

Figure 1:
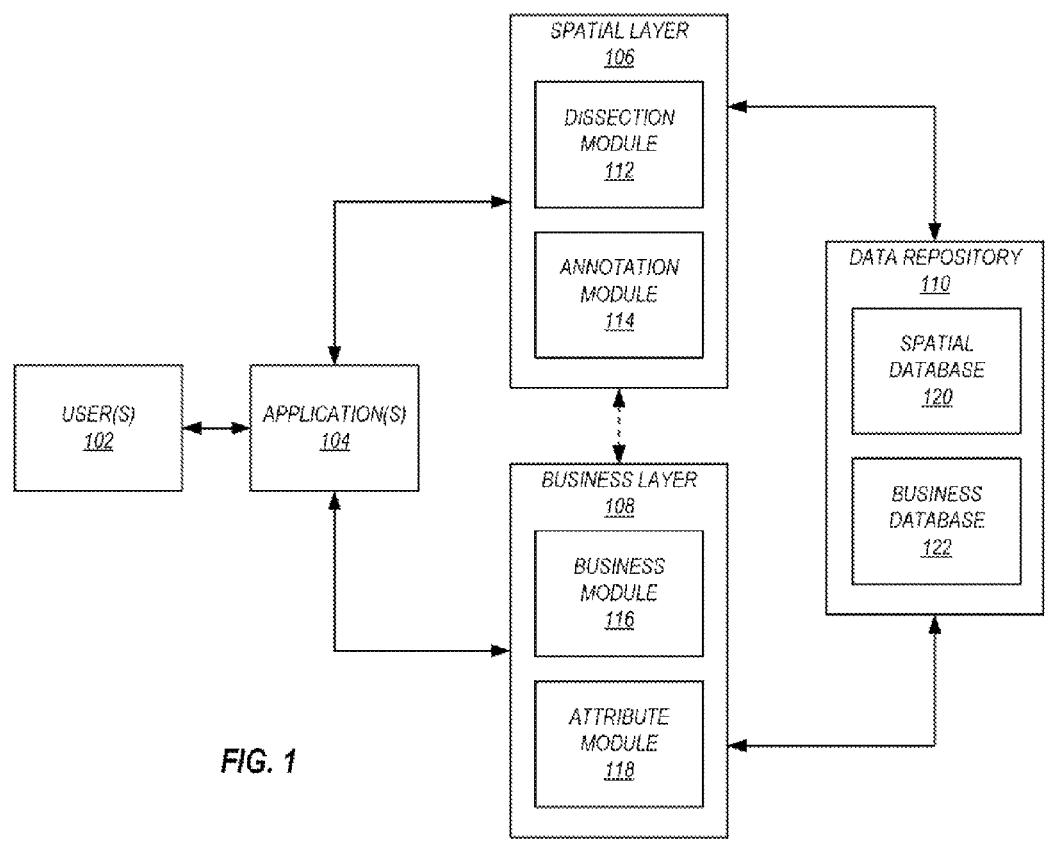
FIG. 1 depicts a system in accordance with one or more embodiments of the invention.

Specific embodiments of the invention will now be described in detail with reference to the accompanying Figures (i.e. FIGS.). Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

FIG. 1 shows a system for performing dissections in accordance with one or more embodiments of the invention. The system includes application(s) (104) interacting with user(s) (102), a spatial layer (106), and a business layer (108). Each of the spatial layer (106) and the business layer (108) further interact with a data repository (110). Each of the aforementioned components of FIG. 1 is described below.

In one or more embodiments of the invention, the user(s) (102) may interact with the application(s) (104). For example, the user(s) (102) may access data using the application(s) (104) over the Internet (or other Wide Area Network or Local Area Network) through a web browser (or via another interface for communicating over a network). Alternatively, the user(s) (102) may interact with the application(s) (104) as an application running natively on the user's (102) local computer (not shown). Further, in one or more embodiments of the invention, the application(s) (104) may interact with the user(s) (102) through use of notifications. The notifications may be conveyed by electronic mail, short message service (SMS), or some other form of electronic correspondence.

In one or more embodiments of the invention, the application(s) (104) may be configured to manage geographic information (e.g., lease information, deed information, natural resource information, etc.) in the data repository (110). For example, the user(s) (102) may use the application(s) (104) to track information related to mineral lease agreements (e.g., oil and gas leases, coal leases, etc.) in a business database (122) of the data repository (110). In this example, the user(s) (102) may also use the applications (104) to manage spatial data representing the boundaries of the mineral lease agreements in a spatial database (120) of the data repository (110). The spatial data may be used in a geographic information system. For example, each mineral lease may have one or more subdivisions commonly known as tracts, and each tract may have one or more legal descriptions which described the geographic area covered by the lease. In this example, the agreement, each tract associated with an agreement, and each legal description describing the boundary of a tract may be associated with a polygon representing the related geographic area.

In one or more embodiments of the invention, the data repository (110) may be a data store (e.g., a database, a file system, one or more data structures configured in a memory, an extensible markup language (XML) file, some other medium for storing data, or any suitable combination thereof, which may include business data (i.e., attribute data) and spatial data (e.g., polygons, polylines, points, raster images, etc.) related to geographic areas.

Those skilled in the art will appreciate that a geographic information system may manage both attribute data and spatial data associated with geographic areas. Specifically, a geographic information system may allow user(s) (102) to view, update, share, and/or manage attribute data and spatial data associated with the geographic areas.

In one or more embodiments of the invention, the application(s) (104) are configured to manage the attribute data and/or spatial data associated with the geographic areas. Those skilled in the art will appreciate that any number of application(s) (104) may be available to the user(s) (102) for interacting with the data repository (110). Typically, the application(s) (104) may include at least one application for managing attribute data and at least one application for managing the spatial data associated with the attribute data. For example, an application (104) may be configured to interact with the spatial component (106) to associate polygons with the attributes related to agreements, tracts, and/or legal descriptions. In another example, an application (104) may be configured to interact with the spatial component (106) to automatically generate polygons for agreements, tracts and/or legal descriptions based on the legal descriptions. In this example, the polygons for legal descriptions may be merged to generate the tract polygons, which may then be merged to generate the agreement polygons. In another example, the application(s) (104) may be configured to interact with the spatial component (106) and the business component (108) to generate and display output based on dissected polygons. In this example, the dissected polygons may enable the output to represent the smallest common areas between boundaries of legal instruments (e.g., oil and gas leases, coal leases, deeds, etc.). Those skilled in the art will appreciate that each of the application(s) (104), the spatial component (106), and the business component (108) may be a server application, an application executing a user's (102) computer (e.g., desktop computer, laptop computer, mobile device, etc.), a web-based application, or some other application configuration.

Those skilled in the art will appreciate that over time, the mineral estate in land may be fractionated to create many mineral owners each owning an undivided interest in the same land parcel. In this case, an owner entity (e.g., an individual, group of individuals, organization, or other legal entity) typically obtains a lease from each mineral owner before mineral development (e.g., drilling, mining, etc.) commences. Alternatively, the mineral rights may also be purchased by deed. In this example, overlapping leases and/or deeds are represented spatially as polygons that have intersecting areas. The legal description of each lease and/or deed may vary substantially so the boundaries described in each legal instrument (i.e., lease) and as represented by each polygon in the geographic information system may not exactly overlap each other. In other words, the polygons do not have coincident geometry. Further, each polygon may related to a set of attributes associated with the legal instrument that the polygon represents. Such attributes may include, but are not limited to: ownership amounts, types of ownership, lease status, payment information, specific provisions, etc. Where the related polygons overlap each other, the various attribute data may be properly analyzed and summarized in view of each distinct overlapping geographic area, allowing for business determinations to be made based on spatially summarized attribute data. For example, attributes may be analyzed and summarized using the dissected polygons representing the smallest common areas created by the overlap of these legal instruments.

In one or more embodiments of the invention, the spatial component (106) includes a dissection module (112) that is configured to dissect the polygons associated with the geographic areas. Those skilled in the art will appreciate that dissecting polygons splits the polygons based on the overlap of the polygons to generate a set of dissected polygons, where the dissected polygons represent the smallest common areas between the boundaries of all the polygons (i.e., the set of dissected polygons includes disjoint polygons). In this case, each smallest common area is represented by a single dissected polygon that is then linked to each of the original polygons that overlaps the smallest common area. Further, each single dissected polygon may be used to accurately represent data for all the legal instruments which overlap the smallest common area. Said another way, the information associated with any number of legal instruments overlapping a given geographic area may be consolidated based on a corresponding dissected polygon.

Those skilled in the art will appreciate that a set of dissected polygons may allow for the geographic area associated with each dissected polygon to be analyzed without regard to overlapping legal instruments. In other words, each dissected polygon may facilitate the analysis of the legal instruments that are associated with the specific geographic area of the dissected polygon, where the dissected polygon provides the smallest common area between the overlapping boundaries of any number of legal instruments.

In one or more embodiments of the invention, the spatial component (106) may also be configured to provide interfaces that allow external systems to interact with the dissection module (112). For example, the spatial component (106)

may be a web application that provides user(s) (102) with access to spatial data and/or attribute data. In this example, the web application may be configured to provide access to summarized attribute data generated using the dissection module (112).

Those skilled in the art will appreciate that in some embodiments of the invention, the dissection module (112) may also be included as a component of at least one of the application(s) (104). In this case, the application(s) (104) may be configured to directly utilize the dissection module (112) as an embedded component.

In one or more embodiments of the invention, the dissection module (112) is configured to receive notifications of spatial updates (e.g., modification of a polygon, addition of a polygon, deletion of a polygon, etc.) from the application(s) (104). In one example, the notifications of spatial updates may be stored in the spatial database (120) of the data repository (110). In this example, the dissection module (112) may monitor the spatial database (12) to obtain the notifications. Once a notification is received, the dissection module (112) may be configured to determine whether a dissection is required for the spatial update. For example, the dissection module (112) may not perform a dissection for spatial updates associated with legal instruments that are not valid because the legal instruments have expired. In another example, the dissection module (112) may not perform a dissection for spatial updates that do not affect the corresponding spatial data (e.g. do not have associated overlapping polygons). In one or more embodiments of the invention, the dissection module (112) is configured to store the polygons resulting from dissections in the spatial database (120).

In one or more embodiments of the invention, the business component (108) includes an attribute module (118) that is configured to store summarized attribute data associated with the dissected polygons in the business database (122). More specifically, the attribute module (118) may be configured to obtain the attribute data for the geographic area associated with a dissected polygon, summarize the attribute data, and then store the summarized attribute data in the business database (122) for the dissected polygon. For example, the dissected polygons may be stored in a dissection layer in the spatial database (120), and the associated attribute data may be stored in the business database (122), where the spatial component (106) is configured to provide the application(s) (106) with access to the dissection layer. Those skilled in the art will appreciate that, for example, as tract and/or agreement polygons are updated, the attribute data for a previously processed geographic area may be re-summarized based on the updated dissection generated for the updated tract and/or agreement polygons.

In one or more embodiments, the business component (108) includes a business module (116) that is configured to obtain business information from the business database (122). For example, application(s) (104) may interact with the business module (116) to obtain attribute data for user(s) (102). In another example, the business module (116) may obtain summarized attribute data for a set of dissected polygons.

In one or more embodiments of the invention, the summarized attribute data associated with dissected polygons may be managed in a many-to-one relationship. More specifically, when a dissected polygon is associated with many legal instruments and the attributes related to such instruments vary between instruments (e.g., depth limitations, ownership information, etc. is different in each instrument), the summarized attribute data may be stored in the business database (122) as multiple records and associated with a single dissected polygon. For example, the business module (116) of the business component (108) may be configured to obtain a unique list of all the depth limitations assigned to tracts related to a set of dissected polygons. In this example, the user (102) may use an application (104) to select depths from the set of the depth limitations and to select owners from a list of unique owners, where the selections of the user (102) are used by the business module (116) to obtain ownership information for the selected owners at the selected depths.

In one or more embodiments of the invention, when polygons or business attributes are modified, the attribute module (118) may be configured to update the summarized attribute data based on the modifications. Further, the attribute module (118) may be configured to summarize attribute data satisfying search criteria. In this case, the business module (116) is configured to obtain the summarized information using a variety of search criteria specified by the user. Examples of search criteria include, but are not limited to, selected owners and/or depths for the application(s) (104).

In one or more embodiments of the invention, the spatial component (106) includes an annotation module (114) configured to generate annotations for dissected polygons. Specifically, the annotation module (114) may generate annotations based on dissected polygons from the dissection module (112) and summarized information from the attribute module (118). For example, the annotation module (114) may generate summarized information related to the owners and the owners' interests for dissected tract polygons for specified depth limitations. Those skilled in the art will appreciate that the annotation module (114) may be configured to accept configurations from user(s) (102), where the configurations specify the style and/or content of the annotations.

In one or more embodiments of the invention, the dissection module (112) is configured to maintain multiple dissection layers. More specifically, the dissection module (112) may be configured to maintain dissection layers based on filters defined by the user (102). For example, a filter may be defined as a structured query language (SQL) statement that defines specific attributes and/or a geographic area to be used to generate a corresponding dissection layer. The dissection module (112) may maintain a dissection layer for each of the filters in addition to a main dissection layer, where the main dissection layer includes all active geographic information.

In one or more embodiments of the invention, the dissection module (112) manages the multiple dissection layers using a relation table stored in the spatial database (120). For example, the relation table and the multiple dissected layers provide consistent, non-overlapping polygon layers for the analysis, display and annotation of summarized tract-level information, where each dissected layer may represent the summarized information for a specific owner entity and/or affiliates or combination of owner entities and/or affiliates. In this example, the application(s) (104) may be configured to allow the user(s) (102) to select one of the multiple dissection layers for use in analyzing and viewing tract-level summarized information, where the user(s) (102) are able to easily change their selected layer between the multiple dissection layers.

Those skilled in the art will appreciate that in the case of multiple dissection layers, the dissection module (112) may be configured to re-dissect polygons in each of the multiple dissection layers in response to receiving a notification of an update for a single polygon (e.g., legal description polygon, tract polygon, agreement polygon). For example, in response to receiving a notification of an update to a legal description polygon, the dissection module (112) may re-dissect polygons for a legal description dissection layer, a tract dissection layer, and an agreement dissection layer. In this example, the modification to the legal description polygon also requires updates to related tract polygon(s) and agreement polygon(s), requiring a re-dissection of the affected polygons in each of the legal description layer, the tract layer, and the agreement layer.

Figure 2:
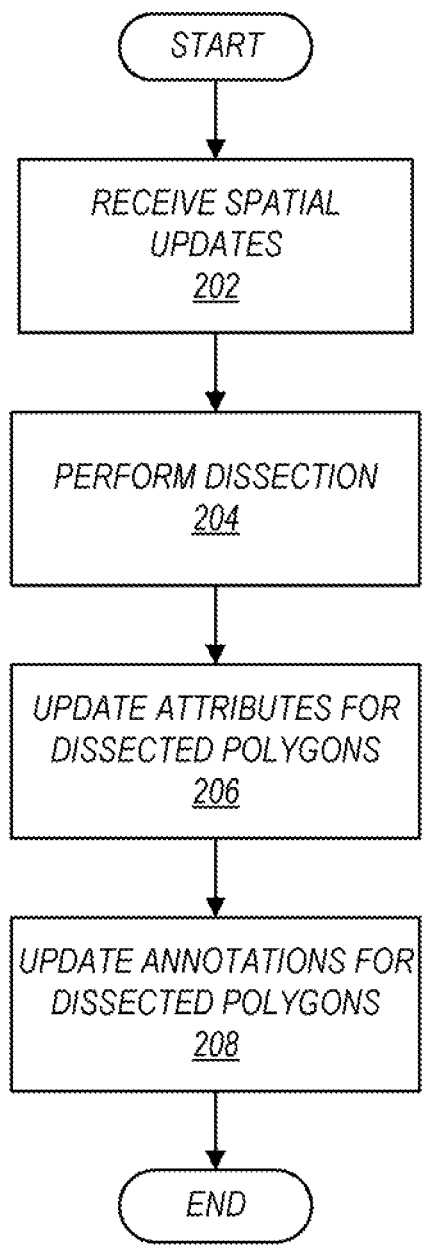
FIGS. 2-3 depict flowcharts of methods in accordance with one or more embodiments of the invention.

FIG. 2 shows a flow chart for performing dissections in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In box 202, spatial updates are received. For example, the spatial updates may refer to modifications of polygons (e.g., lease polygons, deed polygons, etc.) by an application as described above with respect to FIG. 1. In this example, the polygons in a spatial layer may be updated, where notifications of the updated polygons are added to a notification table of a spatial database. In another example, the spatial updates may be received as a notification message specifying the polygons that have been updated.

In box 204, a dissection is performed based on the spatial updates to obtain dissected polygons. Specifically, a dissection of the spatial layer(s) associated with the updated polygons may be performed as discussed with respect to boxes 302-310 of FIG. 3 below.

In box 206, attributes for the dissected polygons in the spatial layer(s) are updated. Specifically, business attributes of geographic areas related to the dissected polygons may be summarized and associated with the dissected polygons as discussed with respect to boxes 312-314 of FIG. 3 below. For example in the case of dissected tract polygons, tract ownership may be summarized for a specific owner entity and associated with each of the dissected tract polygons. In this example, the summarized tract ownership would represent the total tract ownership for the specific owner entity derived from all overlapping polygons associated with the distinct geographic region represented by each dissected tract polygon. In one or more embodiments of the invention, attributes may be updated as described above with respect to the attribute module of FIG. 1.

In box 208, annotations for the dissected polygons in the spatial layer(s) are updated. Specifically, annotations may be generated based on summarized attributes derived from all overlapping polygons associated with the dissected polygons. For example in the case of dissected tract polygons, annotations may be generated to present tract ownership information for each of the dissected tract polygons. In this example, the annotations are generated such that the annotations can be appropriately presented (i.e., legible) on a map including the dissected tract polygons.

Figure 3:
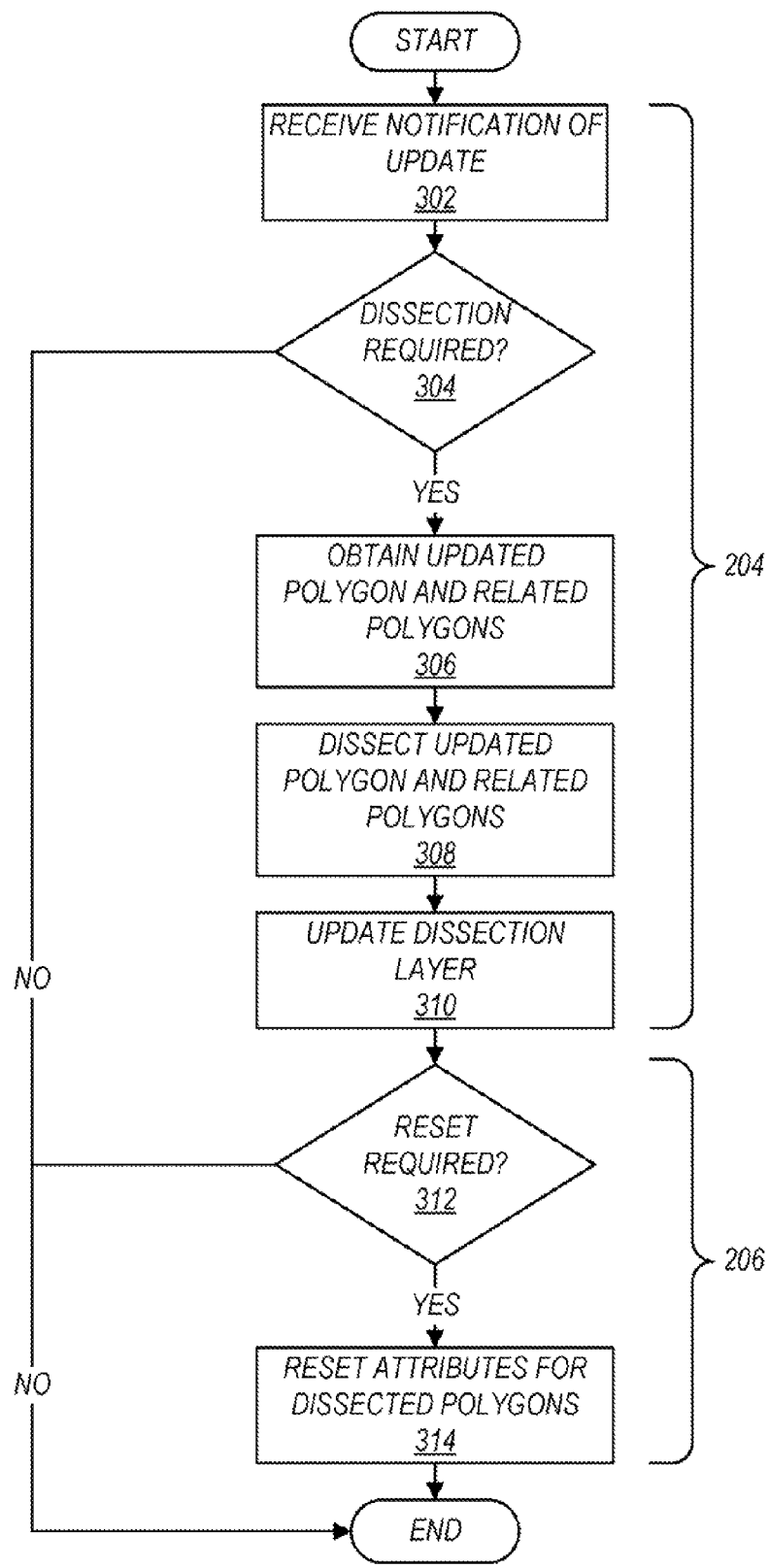

FIG. 3 shows a flow chart for performing dissections in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention. Further, the flow chart of FIG. 3 may describe the performing dissection and updating attributes as described above with respect to box 204 and box 206 of FIG. 2.

In box 302, notification of a spatial update may be received, where the spatial update is related to polygon(s) being added, deleted and/or modified. In one or more embodiments of the invention, the notifications of spatial updates are stored in a table. In this case, the table may be monitored in order to process the spatial updates on a sequential basis to update associated dissected polygons. Alternatively, a notification of the spatial update may be directly received from an application performing the spatial update. The notification may identify the agreement, tract(s), and/or legal description(s) associated with the spatial update.

In box 304, a determination is made as to whether a dissection is required. Examples of when a dissection is not required include, but are not limited to, when the spatial update is associated with an inactive legal instrument, when the spatial update does not affect an existing dissected polygon, when the spatial update is associated with a legal instrument that is designated to not be included in dissections, or when the spatial update corresponds to deleting an overlapping polygon which has geometry coincident with the dissected polygon (i.e., identical to the dissected polygon). If a dissection is not required, the process may end.

If a dissection is required, an updated polygon associated with the legal instrument of the spatial update may be obtained (box 306). Further, the related polygons (i.e., overlapping polygons) of legal instruments overlapping with the same geographic area as the updated polygon may also be obtained. The updated polygons and the related polygons may overlap as described with respect to FIG. 1. In one example, the related polygons may be obtained based on a relation table specifying the relationships (e.g., overlap relationship) between the polygons of legal instruments. In this example, the related polygons may be obtained iteratively by analyzing nested relationships within the relation table (i.e., the relationships of a first set of related polygons may be determined to obtain a second set of related polygons related to the first set of polygons and so on). Those skilled in the art will appreciate that the dissection process may be optimized by limiting the levels of related polygons obtained from the relation table.

In box 308, the updated polygon and related polygons may be dissected. For example, the updated polygon and related polygons may be dissected as described with respect to FIG. 1. In this example, spatial operators (e.g., intersection, subtraction, etc.) may be applied to the updated polygon and the related polygons to obtain the smallest common area polygons (i.e., dissected polygons).

In box 310, a dissection layer may be updated based on the dissected polygons. More specifically, previously dissected polygons of the dissected layer in the same geographic area as the updated polygon and the related polygons may be replaced with the newly dissected polygons. In this case, it may be determined that the previously dissected polygons are invalid based on the spatial update. For example, all previously dissected polygons that overlap the updated polygon may be determined to be invalid, where the invalid dissected polygons may then be deleted and replaced with the newly dissected polygons.

Those skilled in the art will appreciate that the dissection layer may include the dissected polygons for polygons associated with geographic areas (e.g., legal description polygons, tract polygons, agreement polygons, resource polygons, etc.). For example, the dissection layer may include dissected tract polygons, where each dissected tract polygon is associated with summarized tract information for the tracts overlapping the geographic area represented by the dissected tract polygon. In another example, the dissection layer may include dissected agreement polygons, where each dissected agreement polygon is associated with summarized agreement information for the agreements overlapping the geographic area represented by the dissected agreement polygon.

In box 312, a determination is made as to whether a reset of the attribute values related to the dissected polygons is required. Examples of when a reset of the attributes related to the dissected polygons is required include, but are not limited to, when leases associated with the dissected polygons expire, when the attributes (e.g., ownership amount) are modified, and when the rank of tract statuses associated with the dissected polygons are modified. If a reset of the attributes is not required, the process may end.

In box 314, the attributes associated with the dissected polygons are reset. Specifically, a dissected polygon may be associated with summarized data describing all of the overlapping legal descriptions, tracts or agreements occurring in the geographic area defined by the dissected polygon. For example, the summarized data may include, but is not limited to, the tract ownership in the geographic area, the earliest expiration date of a lease in the geographic area, a summarized status of the tracts in the geographic area, etc. In this example, the summarized data may also be used to generate annotations as described above with respect to FIGS. 1-2. Examples of business attributes that may be summarized for a dissected polygon are shown in TABLE 1.

TABLE 1

| Column Name | Business Rules for Summarizing Attributes |
|---|---|
| AGMT_LABEL | Format: AgmtNumber/Suffix List<br>Agreement base number (AGMT_NUMBER)<br>Suffix List<br>All suffixes of intersecting polygons<br>Suffix List Example<br>Agreements related to a dissected polygons<br>TX00023303/001<br>TX00023303/002<br>TX00023303/010<br>Formatted dissected label<br>TX00023303/1-2, 10 |
| EXPIRATION_DATE | Populated with the earliest expiration date, formatted as a character string using the YYYYMMDD convention OR the 2- or 3-character Tract Status Code if earliest expiration date is past the system date.<br>If more than one Tract Status Code is associated with the related tracts, select the code that has the greatest precedence (determined by the Dissection administrator by setting the Rank value on the Tract Status code table). |
| MIN_INTEREST | Populated with the sum of all Mineral Interest values (Lessor Interest from Tract tab) for all active tracts that cover all depths or all tracts have the same single depth limitation. Also if there is more than one unique depth limitation for the related tracts, then only sum the tracts that have the shallowest depth limitation. |
| CO_WI | For each lease, proportionately reduce the Company Interest with the following formula:<br>Lessor Tract Interest × Company Tract Interest = Company Tract Working Interest<br>This value is the sum of the Company Tract Working Interest for all active tracts related to either:<br>The dissected polygon that covers All Depths<br>All tracts that have the same depth limitation<br>If the tracts related to a dissected polygon have different depth limitations or more than one depth limitation, then sum only the shallowest depth.<br>Visibly mark dissected tract polygons with multiple depth limitations by using the data in the Dissection layer TOTAL_DEPTH_SEV column. |
| CO_NRI | Use the same logic as for CO_WI above, except use the following formula to calculate the interest in each lease tract. Then sum each tract to populate this field for the dissection polygon:<br>(1 − Lessor Royalty − Burdens) × Lessor Tract Interest × Company Tract Interest = Company Tract Net Revenue Interest |
| TRACT_GROSS_ACRES | Tract Gross Acres value from a related tract if there is only one record in the LW_DISSECTED_POLYS_RLTN table for this Dissection Polygon ID. This value is null if there is more than one record in the LW_DISSECTED_POLYS_RLTN table. |
| EXPIRATION_DATE_LABEL | Earliest Expiration Date formatted as MM/DD/YYYY OR Tract Status code if earliest expiration date is past the current date. |
| MIN_INT_LABEL | Populate with the value from the MIN_INTEREST column, but format as a |

TABLE 1-continued

| Column Name | Business Rules for Summarizing Attributes |
|---|---|
| | percent with two decimal places (100.00%, 17.12%, 120.02%). |
| CO_WI_LABEL | Populate with the value from the CO_WI column, but format as a percent with two decimal places (100.00%, 17.12%, 120.02%). |
| CO_NRI_LABEL | Populate with the value from the CO_NRI column, but format as a percent with two decimal places (100.00%, 17.12%, 120.02%). |
| FROM_SHALLOW_LABEL | Displays Shallowest (TOTAL_DEPTH_SEV > 1) From Footage/Formation or All Depths (TOTAL_DEPTH_SEV = 0 or 1) From Footage/Formation. |
| TO_SHALLOW_LABEL | Displays Shallowest (TOTAL_DEPTH_SEV > 1) To Footage/Formation or All Depths (TOTAL_DEPTH_SEV = 0 or 1) To Footage/Formation. |
| TOTAL_DEPTH_SEV | Display a count to the total depth limitation intervals associated with the dissected polygon, eliminating any duplicates from the count. "All Depths" is not included as a limitation. |
| RIGHTS_HELD | Concatenated list of distinct LW_TRACT_ACRES.RIGHTS_HELD_SUMMARY values from the related tracts (comma delimited). |

In one or more embodiments of the invention, each dissected polygon may be used as a spatial index to summarize data attributes of the legal instruments related to the geographic area represented by the dissected polygon. In other words, a dissected polygon represents the smallest common area of all polygons that overlap the geographic area represented by the dissected polygon, where the smallest common area allows for the database attributes to be accurately summarized in that geographic area. In this case, the data relationships between each of the dissected polygons and the legal instruments may be maintained in a data relation table, allowing for the data attributes to be efficiently summarized by applying business rules such as those described in TABLE 1. The data relation table may be maintained based on the spatial updates (i.e., the data relationships to the data attributes may be updated as the polygons are dissected as described with respect to box 308). For example, when a dissected polygon is generated in response to a spatial update, the data relation table may be updated with the data relationships between the dissected polygon and the data attributes of the legal instruments related to the geographic area represented by the dissected polygon.

Those skilled in the art will appreciate that box 302 to box 314 may be repeated any number of times for each spatial update performed. In this case, the workflow may be repeated any number of times for the same geographic area when multiple spatial updates are performed in the same geographic area. Thus, the set of dissected polygons and summarized attribute data are actively updated in response to spatial updates in order to reflect the most current summarized attribute data for each of the geographic area represented by each dissected polygon.

In one or more embodiments of the invention, the dissected polygons and summarized data may be used to generate and display output related to geographic areas (e.g., legal descriptions, tracts, agreements, resources, etc.). For example, the output may include dissected tract polygons and the corresponding mineral ownership of the tracts summarized for all of the mineral leases related to each dissected tract polygon. In another example, the output may include dissected agreement polygons and the most immediate agreement expiration date for all of the agreements related to each dissected agreement polygon.

Figure 4A:
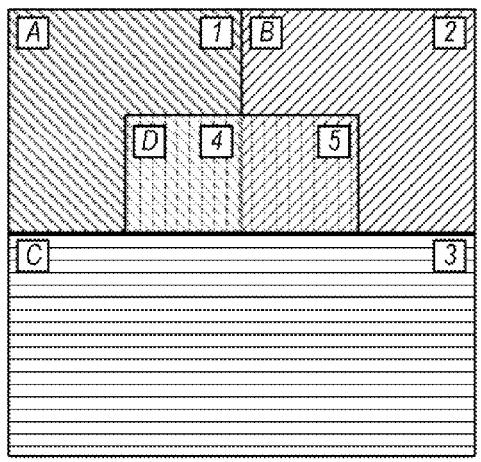
FIGS. 4A-4C show diagrams of a dissection example in accordance with one or more embodiments of the invention.
Figure 4B:
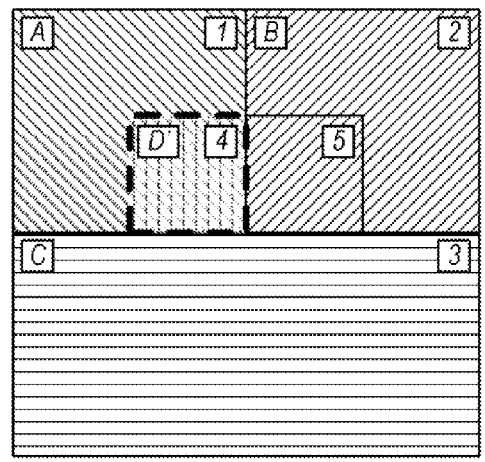
Figure 4C:
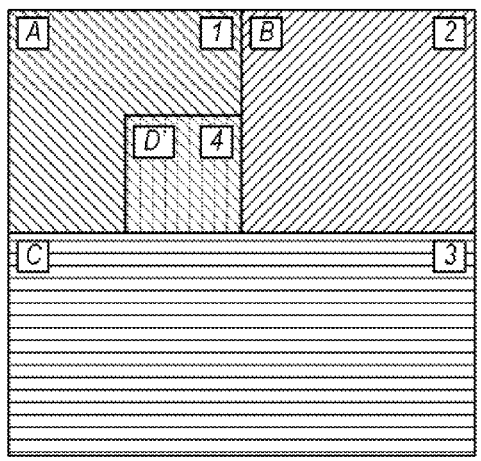

FIG. 4A-C show examples of dissected spatial data in accordance with one or more embodiments of the invention. The examples of FIGS. 4A-C have been simplified to aid in the understanding of the invention and, as such, the invention should not be limited to these examples.

FIG. 4A shows spatial data for a set of tracts. In one or more embodiments of the invention, the spatial data is initially generated as described above with respect to FIG. 2. In this example, the spatial data includes tract polygons (e.g., tract polygon A, tract polygon B, tract polygon C, tract polygon D) and dissected polygons (e.g., dissected polygon 1, dissected polygon 2, dissected polygon 3, dissected polygon 4, dissected polygon 5).

Each of the tract polygons is represented by a hash pattern to show the overlap in tract polygons. Specifically, tract polygon D overlaps tract polygon A and tract polygon B. Further, tract polygon A, tract polygon B, and tract polygon D are dissected into distinct regions represented as dissected polygon 1, dissected polygon 2, dissected polygon 4, and dissected polygon 5. Tract polygon C does not overlap with any other tract polygons; thus, tract polygon C is dissected to obtain dissected polygon 3, where tract polygon C and dissected polygon 3 have the same geometry.

In FIG. 4B, an updated tract polygon D' is shown in the spatial data. In this example, tract polygon D' now only overlaps with tract polygon A. In other words, tract polygon B and dissected polygon 5 no longer overlap with tract polygon D'. In response to the receiving notification of the update to tract polygon D', the spatial data is re-dissected as described above with respect to FIGS. 2-3. In this case, the updated tract polygon D' and any polygons related to tract polygon D are obtained prior to performing the dissection. Specifically, a tract relation table may be consulted to determine which tract polygons were associated with tract polygon D (i.e., the tract polygons related to tract polygon D prior to the update). As discussed above, tract polygon D overlapped with tract polygon A and tract polygon B, each of which would be related to tract polygon D in the relation table. Thus, tract polygon A, tract polygon B, and tract polygon D' are obtained for the re-dissection. Tract polygon C is not required for the dissection because tract polygon C does not overlap with tract polygon D. Those skilled in the art will appreciate that only the polygons affected by an update are obtained for re-dissection, thereby allowing the re-dissection to be performed in an efficient manner that ignores any polygons unaffected by the update.

In FIG. 4C, the results of the re-dissection are shown. After the re-dissection, tract polygon D' only overlaps with tract polygon A, and the dissected layer only includes dissected polygon 1, dissected polygon 2, dissected polygon 3, and dissected polygon 4. Because tract polygon B and tract polygon D' no longer overlap, tract polygon B is not dissected by tract polygon D' and now shares the same geometry as dissected polygon 2. At this stage, the business attributes associated with the tract polygons may be re-summarized and annotations may be re-generated for each of the dissected polygons as described above with respect to FIG. 2.

Figure 5:
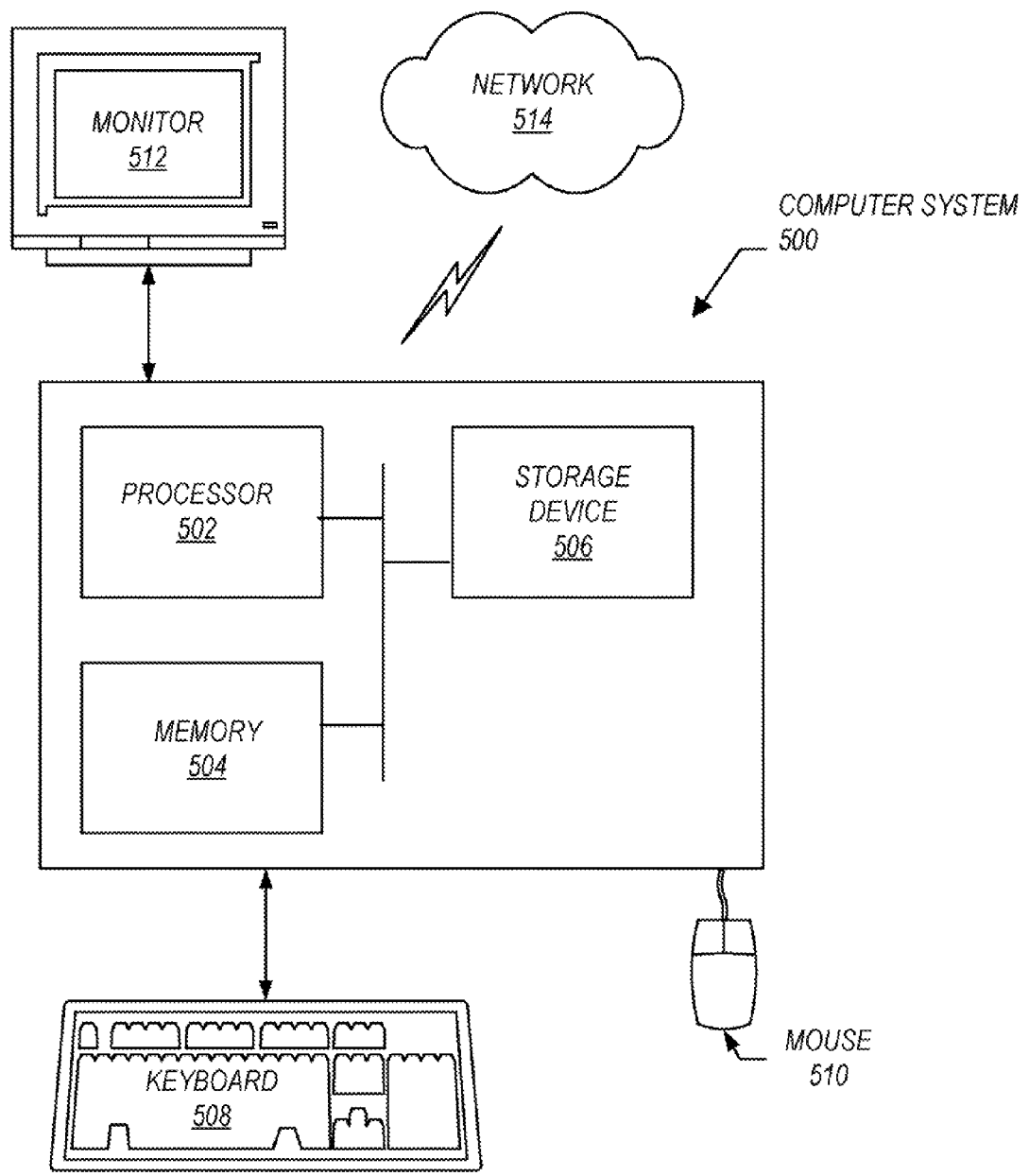
FIG. 5 shows a computer system in accordance with one or more embodiments of the invention.

The invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice one or more particular embodiments of the invention (or portions thereof).

Further, those skilled in the art will appreciate that one or more elements of the aforementioned computer system (500) may be located at a remote location and connected to the other elements over a network. Further, one or more embodiments may be implemented on a distributed system having a plurality of nodes, where each portion may be located on a different node within the distributed system. In one or more embodiments, the node corresponds to a computer system. Alternatively, the node may correspond to a processor with associated physical memory. The node may alternatively correspond to a processor with shared memory and/or resources.

In one or more embodiments of the invention, software instructions for performing one or more embodiments of the invention may be stored on a computer readable medium such as a compact disc (CD), a diskette, a tape, or any other computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:
   receiving a notification of a spatial update for a third polygon of a plurality of polygons,
      wherein, after the update, the third polygon overlaps with a first polygon and a second polygon of the plurality of polygons,
      wherein the first polygon, the second polygon, and the third polygon each represent a geographic area,
      wherein the first polygon is associated with a first mineral lease, the second polygon is associated with a second mineral lease, and the third polygon is associated with a third mineral lease, and
      wherein at least a portion of each of the first mineral lease, the second mineral lease, and the third mineral lease are owned by a first owner;
   making a determination that a dissection is required in response to the spatial update;
   in response to the determination:
      dissecting the first polygon, second polygon, and third polygon to obtain a first dissected polygon, a second dissected polygon, a third dissected polygon, and a fourth dissected polygon, wherein none of the first dissected polygon, the second dissected polygon, the third dissected polygon, and the fourth dissected polygon overlap; and
      obtaining attribute data for each of the first polygon, the second polygon, and the third polygon;
      summarizing attribute data for the first dissected polygon using attribute data for the first polygon;
      summarizing attribute data for the second dissected polygon using attribute data for the first polygon and the third polygon to obtain first summarized attribute data, wherein the first summarized attribute data comprises a first aggregate mineral interest for the first owner determined using the first mineral lease and the third mineral lease;
      summarizing attribute data for the third dissected polygon using attribute data for the second polygon and the third polygon to obtain second summarized attribute data, wherein the second summarized attribute data comprises a second aggregate mineral interest determined using the second mineral lease and the third mineral lease;
      summarizing attribute data for the fourth dissected polygon using attribute data for the second polygon; and
      displaying the second dissected polygon with the first aggregate mineral interest and the third dissected polygon with the second aggregate mineral interest.

2. The non-transitory computer readable medium of claim 1, the method further comprising:
   updating data relationships based on the spatial update, wherein at least one of the data relationships defines a relationship between the second dissected polygon and attribute data of the first polygons.

3. The non-transitory computer readable medium of claim 1, the method further comprising:
   updating annotations of the second dissected polygon using the first summarized attribute data.

4. The non-transitory computer readable medium of claim 1, wherein the second dissected polygon represents a smallest common geographic area between the first polygon and the second polygon.

5. The non-transitory computer readable medium of claim 1, wherein the spatial update is one selected from a group consisting of adding the third polygon and modifying the third polygon.

6. The non-transitory computer readable medium of claim 1, the method further comprising:
receiving a notification of a spatial update for a fourth polygon of the plurality of polygons,
wherein, after the spatial update for the fourth polygon, the fourth polygon overlaps with the first polygon,
wherein the fourth polygon is associated with a fourth mineral lease, wherein none of the fourth mineral lease is owned by the first owner and wherein at least a portion of the fourth mineral lease is owned by a second owner; and
making, in response to the notification of the spatial update for the fourth polygon, a determination that a dissection is not required in response to the spatial update for the fourth polygon based on the first owner not owning any of the fourth mineral lease.

7. The non-transitory computer readable medium of claim 1, wherein the first owner is a company.

8. The non-transitory computer readable medium of claim 1, wherein the first mineral lease is at least partially owned by a second owner and wherein first summarized attribute data does not include any mineral interest information for the second owner.

9. The non-transitory computer readable medium of claim 1, the method further comprising:
prior to receiving the notification of the spatial update for the third polygon, generating a dissection layer comprising the first polygon and the second polygon,
wherein generating the dissection layer comprises using information about the first owner to identify the first polygon and the second polygon.

10. A system comprising:
a processor;
a memory comprising an application, wherein the application, which when executed on the processor, is configured to perform a spatial update for a third polygon of a plurality of polygons,
wherein, after the update, the third polygon overlaps with a first polygon and a second polygon of the plurality of polygons,
wherein the first polygon, the second polygon, and the third polygon each represent a geographic area,
wherein the first polygon is associated with a first mineral lease, the second polygon is associated with a second mineral lease, and the third polygon is associated with a third mineral lease,
wherein at least a portion of each of the first mineral lease, the second mineral lease, and the third mineral lease are owned by a common owner, and
wherein at least a portion of each of the first polygon, the second polygon and the third polygon are associated with a common depth range;
a dissection module for execution on the processor and configured to:
in response to receiving a notification of the spatial update, make a determination that a dissection is required;
in response to the determination:
dissect the first polygon, second polygon, and third polygon to obtain a first dissected polygon, a second dissected polygon, a third dissected polygon, and a fourth dissected polygon, wherein none of the first dissected polygon, the second dissected polygon, the third dissected polygon, and the fourth dissected polygon overlap; and
a data repository coupled to the dissection module and configured to store the first dissected polygon, the second dissected polygon, the third dissected polygon, and the fourth dissected polygon,
an annotation module configured to:
obtain attribute data for each of the first polygon, the second polygon, and the third polygon;
summarize attribute data for the first dissected polygon using attribute data for the first polygon,
summarize attribute data for the second dissected polygon using attribute data for the first polygon and the third polygon to obtain first summarized attribute data, wherein the first summarized attribute data comprises a first aggregate mineral interest for the common owner at the common depth range determined using the first mineral lease and the third mineral lease,
summarize attribute data for the third dissected polygon using attribute data for the second polygon and the third polygon to obtain second summarized attribute data, wherein the second summarized attribute data comprises a second aggregate mineral interest determined using the second mineral lease and the third mineral lease,
summarize attribute data for the fourth dissected polygon using attribute data for the second polygon, and
wherein the application is further configured to display the second dissected polygon with the first aggregate mineral interest and the third dissected polygon with the second aggregate mineral interest.

11. The system of claim 10, further comprising:
an attribute module configured to:
update data relationships based on the spatial update, wherein at least one of the data relationships defines a relationship between the second dissected polygon and attribute data of the first polygons.

12. The system of claim 10, wherein the annotation module is further configured to:
update annotations of the second dissected polygon using the first summarized attribute data.

13. The system of claim 10, wherein the second dissected polygon represents a smallest common geographic area between the first polygon and the second polygon.

14. The system of claim 10, wherein the spatial update is one selected from a group consisting of adding the third polygon and modifying the third polygon.

15. The system of claim 10, wherein the dissection module is further configured to:
in response to receiving a second notification of the spatial update, make a second determination to update a dissection layer comprising the first dissected polygon, the second dissected polygon, the third dissected polygon, and the fourth dissected polygon, wherein the second notification is generated in response to at least one data attribute for the second polygon change resulting in the second polygon not being associated with at least one selected from a group consisting of the common depth range and the common owner;
in response to the second determination:
re-dissect the dissection layer to generate the first dissected polygon, the second dissected polygon, and a fifth dissected polygon, wherein the fifth dissected polygon corresponds to a portion of the third polygon that does not overlap the first polygon, wherein after the re-dissection the dissection layer does not include the third dissected polygon and does not include the fourth dissected polygon; and the annotation module further configured to:
summarize attribute data for the fifth dissected polygon using attribute data for the third polygon.

16. The system of claim 15, wherein the annotation module is further configured to:
summarize attribute data for the first dissected polygon using attribute data for the first polygon,
re-summarize attribute data for the second dissected polygon using attribute data for the first polygon and the third polygon to obtain the first summarized attribute data, wherein the first summarized attribute data comprises the first aggregate mineral interest for the common owner at the common depth range determined using the first mineral lease and the third mineral lease.

17. The system of claim 10, wherein the application, when executed by the processor, is further configured to:
receive a notification of a spatial update for a fourth polygon of the plurality of polygons,
wherein, after the spatial update for the fourth polygon, the fourth polygon overlaps with the first polygon,
wherein the fourth polygon is associated with a second depth range, and wherein the second depth range does not overlap with the first depth range; and
make, in response to the notification of the spatial update for the fourth polygon, a determination that a dissection is not required in response to the spatial update for the fourth polygon based on second depth range not overlapping with the first depth range.

18. The system of claim 10, wherein the application, when executed by the processor, is further configured to:
receive a notification of a spatial update for a fourth polygon of the plurality of polygons,
wherein, after the spatial update for the fourth polygon, the fourth polygon overlaps with the first polygon,
wherein the fourth polygon is associated with a fourth mineral lease, wherein none of the fourth mineral lease is owned by the first owner and wherein at least a portion of the fourth mineral lease is owned by a second owner; and
make, in response to the notification of the spatial update for the fourth polygon, a determination that a dissection is not required in response to the spatial update for the fourth polygon based on the first owner not owning any of the fourth mineral lease.

19. A non-transitory computer readable medium comprising instructions, which when executed by a processor perform a method, the method comprising:
receiving a notification of a spatial update for a third polygon of a plurality of polygons,
wherein, after the update, the third polygon overlaps with a first polygon and a second polygon of the plurality of polygons,
wherein the first polygon, the second polygon, and the third polygon each represent a geographic area, wherein the first polygon is associated with a first mineral lease, the second polygon is associated with a second mineral lease, and the third polygon is associated with a third mineral lease, and
wherein at least a portion of each of the first polygon, the second polygon and the third polygon are associated with a first depth range;
making a determination that a dissection is required in response to the spatial update;
in response to the determination:
dissecting the first polygon, second polygon, and third polygon to obtain a first dissected polygon, a second dissected polygon, a third dissected polygon, and a fourth dissected polygon, wherein none of the first dissected polygon, the second dissected polygon, the third dissected polygon, and the fourth dissected polygon overlap; and
obtaining attribute data for each of the first polygon, the second polygon, and the third polygon;
summarizing attribute data for the first dissected polygon using attribute data for the first polygon;
summarizing attribute data for the second dissected polygon using attribute data for the first polygon and the third polygon to obtain first summarized attribute data, wherein the first summarized attribute data comprises a first aggregate mineral interest at the first depth range determined using the first mineral lease and the third mineral lease;
summarizing attribute data for the third dissected polygon using attribute data for the second polygon and the third polygon to obtain second summarized attribute data, wherein the second summarized attribute data comprises a second aggregate mineral interest determined using the second mineral lease and the third mineral lease;
summarizing attribute data for the fourth dissected polygon using attribute data for the second polygon; and
displaying the second dissected polygon with the first aggregate mineral interest and the third dissected polygon with the second aggregate mineral interest.

20. The non-transitory computer readable medium of claim 19, the method further comprising:
receiving a notification of a spatial update for a fourth polygon of the plurality of polygons, wherein, after the spatial update for the fourth polygon, the fourth polygon overlaps with the first polygon, wherein the fourth polygon is associated with a second depth range, and wherein the second depth range does not overlap with the first depth range; and
making, in response to the notification of the spatial update for the fourth polygon, a determination that a dissection is not required in response to the spatial update for the fourth polygon based on second depth range not overlapping with the first depth range.

21. The non-transitory computer readable medium of claim 19,
wherein at least a second portion of each of the first polygon, the second polygon and the third polygon are associated with a second depth range;
wherein summarizing the attribute data for the second dissected polygon using the attribute data for the first polygon and the third polygon to obtain the first summarized attribute data further comprises using a first aggregate mineral interest at the second depth range determined using the first mineral lease and the third mineral lease;
wherein the first depth range and the second depth range are non-contiguous.

22. The non-transitory computer readable medium of claim 19, the method further comprising:
prior to receiving the notification of the spatial update for the third polygon, generating a dissection layer comprising the first polygon and the second polygon,
wherein generating the dissection layer comprises using information about the first depth range to identify the first polygon and the second polygon.

* * * * *